United States Patent
Imazawa et al.

(10) Patent No.: US 10,110,099 B2
(45) Date of Patent: Oct. 23, 2018

(54) ROTOR FOR ROTATING ELECTRIC MACHINE

(75) Inventors: Yoshiro Imazawa, Tokyo (JP); Shinichiro Minami, Tokyo (JP); Hitoshi Shibagaki, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 790 days.

(21) Appl. No.: 14/361,202

(22) PCT Filed: Mar. 8, 2012

(86) PCT No.: PCT/JP2012/055914
§ 371 (c)(1),
(2), (4) Date: May 28, 2014

(87) PCT Pub. No.: WO2013/132626
PCT Pub. Date: Sep. 12, 2013

(65) Prior Publication Data
US 2014/0361658 A1    Dec. 11, 2014

(51) Int. Cl.
*H02K 13/00*    (2006.01)
*H01R 39/08*    (2006.01)
(Continued)

(52) U.S. Cl.
CPC ........... *H02K 13/003* (2013.01); *H01R 39/08* (2013.01); *H01R 39/16* (2013.01); *H02K 3/528* (2013.01);
(Continued)

(58) Field of Classification Search
CPC ........ H02K 13/003; H02K 7/003; H02K 1/28; H02K 3/528; H02K 13/02; H02K 15/12;
(Continued)

(56) References Cited

U.S. PATENT DOCUMENTS 2,279,956 A    4/1942  Sipe
4,585,967 A *  4/1986  Mayer ..................... H02K 1/28
                                                        29/598

(Continued)

FOREIGN PATENT DOCUMENTS

DE    2927816 A *  1/1980
EP    0094163 A1    11/1983
(Continued)

OTHER PUBLICATIONS

Honda (JP 05130757 A) English Translation.*
(Continued)

*Primary Examiner* — Thomas Truong
*Assistant Examiner* — Robert E Mates
(74) *Attorney, Agent, or Firm* — Sughrue Mion, PLLC; Richard C. Turner

(57) ABSTRACT

In a rotor of the present invention, an interference is set to have a relationship so that an inner diameter of a press-fit projecting portion before press-fitting is smaller than a diameter of a shaft, and in the inner wall surface, a non-projecting portion is formed without projecting portions on a portion in which a weld line is generated by the molding.

7 Claims, 6 Drawing Sheets

(51) Int. Cl.
*H01R 43/10* (2006.01)
*H02K 3/52* (2006.01)
*H02K 13/02* (2006.01)
*H02K 15/12* (2006.01)
*H01R 39/16* (2006.01)
*H02K 7/00* (2006.01)

(52) U.S. Cl.
CPC ............. *H02K 13/02* (2013.01); *H02K 15/12* (2013.01); *H01R 43/10* (2013.01); *H02K 7/003* (2013.01)

(58) Field of Classification Search
CPC ........ H01R 39/08; H01R 39/16; H01R 43/10; H01R 39/00; H01R 39/085; H01R 39/10; H01R 39/12; H01R 39/34; H01R 39/64
USPC .............................. 310/231, 232, 71; 439/13
See application file for complete search history.

(56) References Cited

U.S. PATENT DOCUMENTS

| | | | | |
|---|---|---|---|---|
| 5,907,208 A | * | 5/1999 | Kristen | ................ H02K 13/006 310/216.115 |
| 2002/0043880 A1 | * | 4/2002 | Suzuki | .................... H02K 7/06 310/12.14 |
| 2006/0070228 A1 | * | 4/2006 | Stewart | .................. H02K 1/148 29/596 |
| 2007/0157997 A1 | * | 7/2007 | Minemura | ............... C23G 5/00 148/206 |

FOREIGN PATENT DOCUMENTS

| | | | | | |
|---|---|---|---|---|---|
| EP | 1013951 A1 | * | 6/2000 | .......... | F16D 1/0858 |
| FR | 2603139 A1 | * | 2/1988 | ............ | H01R 43/10 |
| FR | 2613880 A1 | | 10/1988 | | |
| GB | 957337 A | * | 5/1964 | ................ | F16C 3/02 |
| GB | 1208872 A | | 1/1969 | | |
| GB | 1224419 A | * | 3/1971 | ............... | B21K 1/30 |
| JP | 59-137013 U | | 9/1984 | | |
| JP | 5-130757 A | | 5/1993 | | |
| JP | 05130757 A | * | 5/1993 | | |
| JP | 2000-232744 A | | 8/2000 | | |
| JP | 2000270505 A | * | 9/2000 | | |
| JP | 2005-54722 A | | 3/2005 | | |
| JP | 2005054722 A | * | 3/2005 | | |
| JP | 3845952 B2 | | 11/2006 | | |
| JP | 2008-157314 A | | 7/2008 | | |
| JP | 2010-221550 A | | 10/2010 | | |

OTHER PUBLICATIONS

Mizunaga (JP 2000270505 A) English Translation.*
Braun (EP 1013951 A1) English Translation.*
Shigley and Mischke, Mechanical Engineering Design, sixth ed. (McGraw-Hill 2001) pp. 103-104, 135-137, 256-257.*
Sawai (JP 2005054722 A) English Translation.*
Mazzorana (DE 2927816 A) English Translation.*
Bonnefon (FR 2603139 A1) English Translation.*
Communication dated Sep. 8, 2015 from the European Patent Office issued in corresponding European application No. 12870477.2.
International Search Report of PCT/JP2012/055914, dated Jun. 12, 2012.

* cited by examiner

ROTOR FOR ROTATING ELECTRIC MACHINE

CROSS REFERENCE TO RELATED APPLICATIONS

This application is a National Stage of International Application No. PCT/JP2012/055914 filed Mar. 8, 2012, the contents of all of which are incorporated herein by reference in their entirety.

TECHNICAL FIELD

The present invention relates to a rotor for a rotating electric machine including a shaft over which a slip ring device is press-fitted.

BACKGROUND ART

Conventionally, as an AC generator for a vehicle, there is known the one which employs a Lundell-type rotor including a pair of claw-like magnetic poles axially supported by an intermediate portion of a shaft (for example, see Patent Literature 1).

In the rotor, a slip ring device including a molded-body main body formed by molding, which retains a first ring and a second ring disposed coaxially so as to be separated away from each other in an insulated fashion, is press-fitted over a distal end portion of the shaft.

On the other hand, in the case where a molded body including the molded-body main body is formed by molding, a weld line is generated when branch flows of a melted resin meet inside a die. In order to minimize the generation of the weld line, measures to increase temperatures of the melted resin and the die and to increase an injection pressure are taken (for example, see Patent Literature 2).

CITATION LIST

Patent Literature

[PTL 1] Japanese Patent No. 3845952
[PTL 2] Japanese Patent Application Laid-open No. 2010-221550

SUMMARY OF INVENTION

Technical Problem

In the case of the rotor described in Patent Literature 1 described above, the molded-body main body has a larger thermal expansion coefficient than that of the shaft. Therefore, an inner diameter of a shaft fitting portion of the molded body increases at a high temperature. As a result, there is a problem of occurrence of an inconvenience that the slip ring device turns relative to the shaft due to a contact friction of a brush against a first ring and a second ring or a fluctuation in rotation caused by periodic explosions occurring in an engine and a change in speed of a vehicle.

When an interference between the molded-body main body and the shaft is set larger so as to prevent the occurrence of inconvenience described above at a high temperature, there is a problem in that a crack and breakage are likely to occur at the time of assembly.

In particular, there is a problem in noticeable generation of a crack at the weld line with a tensile strength lowered to about 30%, which is inevitably generated during the molding.

The present invention has been made to solve the problems described above, and therefore has an object to provide a rotor for a rotating electric machine, which is capable of preventing an interference from becoming smaller than the amount of expansion of a molded-body main body at a high temperature and reducing occurrence of a crack and breakage of the molded-body main body when a slip ring device is assembled to a shaft with the interference described above.

Solution to Problem

According to one embodiment of the present invention, there is provided a rotor for a rotating electric machine, including: a shaft having an end portion with a smooth circumferential surface; a slip ring device press-fitted over the shaft, the slip ring device including: a first ring and a second ring disposed coaxially so as to be separated away from each other, the first ring and the second ring being electrically connected to a rotor coil; and a molded-body main body formed of a resin by molding, for retaining the first ring and the second ring in an insulated fashion; and a press-fit projecting portion including a plurality of projecting portions extending along an axial direction formed on an inner wall surface of a hole of the molded-body main body into which the shaft is press-fitted, in which an interference is set to have a relationship so that an inner diameter of the press-fit projecting portion before press-fitting is smaller than a diameter of the shaft, and the inner wall surface includes a non-projecting portion without the plurality of projecting portions, which is formed on a portion in which a weld line is generated by the molding.

Advantageous Effects of Invention

According to the rotor for the rotating electric machine of the present invention, the interference is set to have the relationship so that the inner diameter of the press-fit projecting portion before press-fitting is smaller than the diameter of the shaft. Moreover, the non-projecting portion is formed on the portion of the inner wall surface of the hole of the molded-body main body, in which the weld line is generated as a result of the molding. Therefore, a crack and breakage of the molded-body main body are reduced when the slip ring device is press-fitted over the shaft.

Moreover, by setting the interference so as not to become smaller than the amount of expansion of the molded-body main body at the high temperature, the slip ring device can be prevented from turning relative to the shaft.

DESCRIPTION OF EMBODIMENTS

Figure 1:
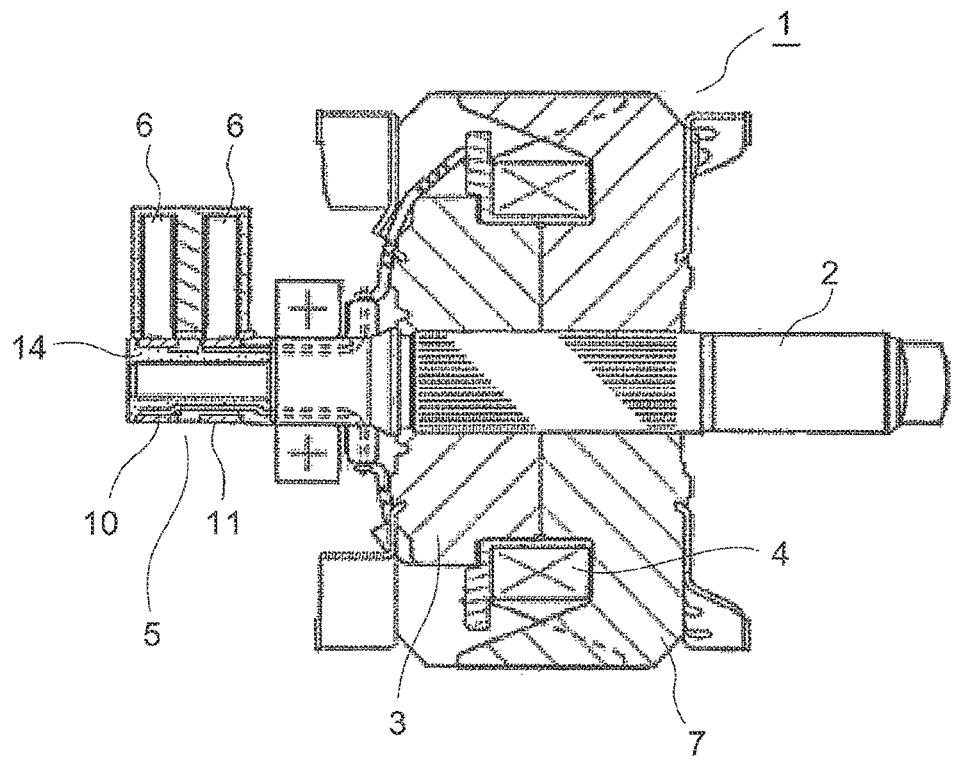
FIG. 1 is a sectional side view illustrating a rotor for an AC generator for a vehicle according to a first embodiment of the present invention.

Referring to the accompanying drawings, embodiments of the present invention are described below. In the drawings, the same or corresponding components and parts are denoted by the same reference symbols.

First Embodiment

FIG. 1 is a sectional side view illustrating a rotor 1 for an AC generator for a vehicle according to a first embodiment of the present invention.

The rotor 1 for the AC generator for a vehicle (hereinafter abbreviated as "generator") is provided on an inner side of a stator (not shown) fixed to an inner wall of a case (not shown).

The rotor 1 includes a shaft 2 having one end portion to which a pulley (not shown) is fixed, a pair of claw-like magnetic poles 3 and 4 fixed to an intermediate portion of the shaft 2 so as to be opposed to each other, a rotor coil 7 formed by winding a conductor inside the claw-like magnetic poles 3 and 4, and a slip ring device 5 press-fitted over another end portion of the shaft 2.

A stator includes a stator coil (not shown) wound around a stator core (not shown).

In the generator having the configuration described above, a current is supplied from a battery (not shown) through brushes 6 and the slip ring device 5 to the rotor coil 7 of the rotor 1 to generate a magnetic flux. As a result, the N-pole and the S-pole are respectively generated in the claw-like magnetic poles 3 and 4 of the rotor 1.

On the other hand, the pulley is driven by an engine, and the rotor 1 is rotated by the shaft 2. Therefore, a rotating magnetic field is applied to the stator core to generate an electromotive force in the stator coil.

Figure 2:
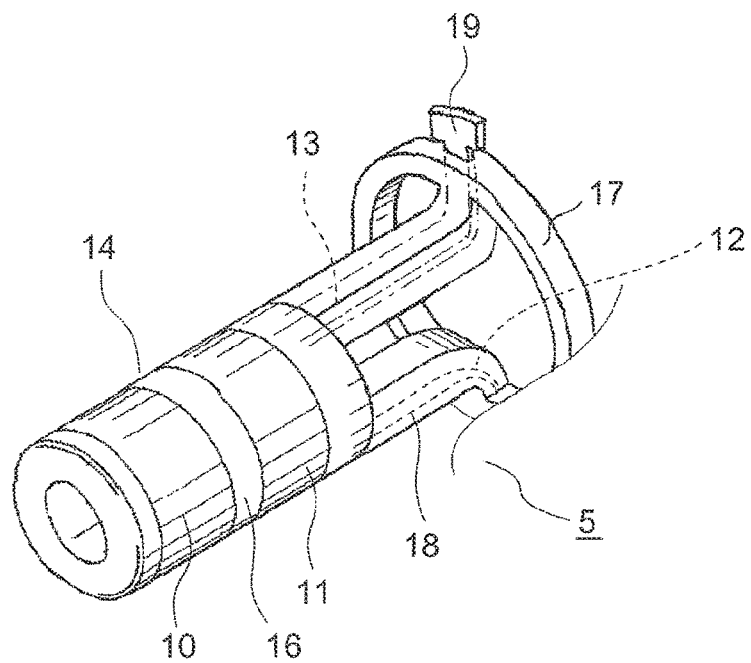
FIG. 2 is a perspective view illustrating the slip ring device illustrated in FIG. 1.
Figure 3:
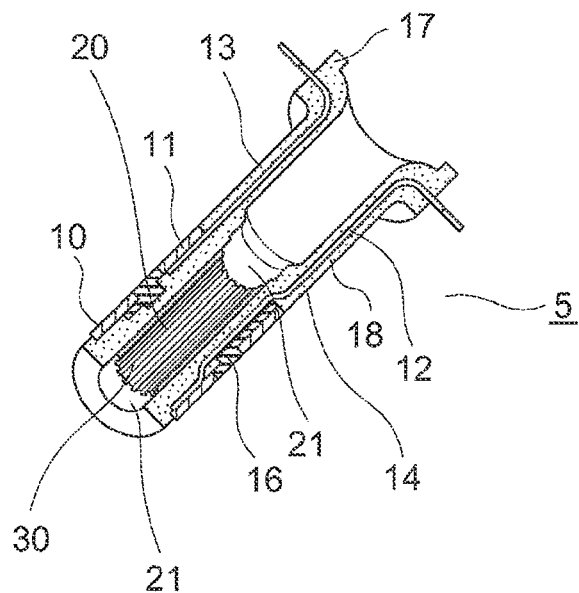
FIG. 3 is a sectional perspective view illustrating the slip ring device illustrated in FIG. 2.
Figure 4:
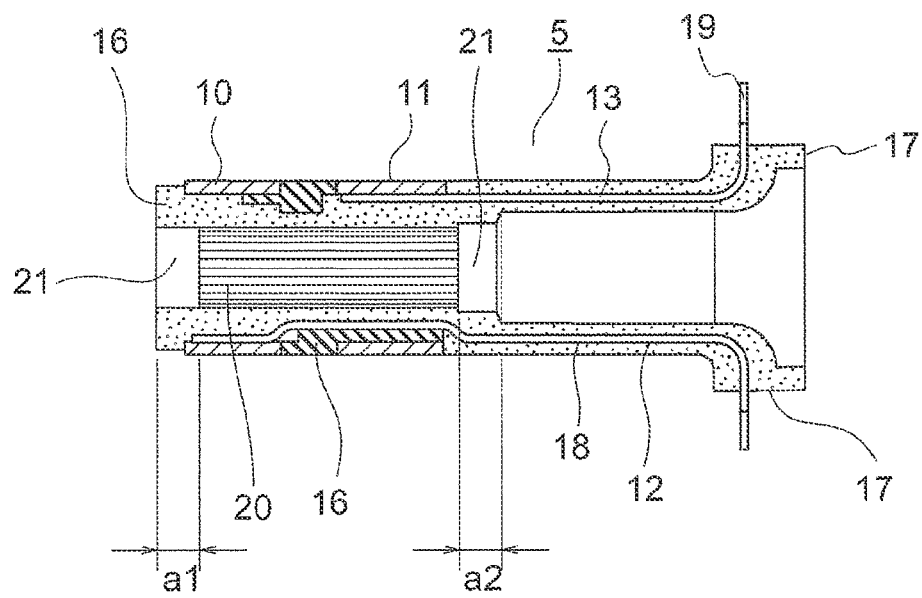
FIG. 4 is a sectional side view illustrating the slip ring device illustrated in FIG. 2.

FIG. 2 is a perspective view illustrating the slip ring device 5 illustrated in FIG. 1, FIG. 3 is a sectional perspective view illustrating the slip ring device 5 illustrated in FIG. 2, and FIG. 4 is a sectional side view illustrating the slip ring device 5 illustrated in FIG. 2.

The slip ring device 5 includes a first ring 10, a second ring 11, a long lead 12 having one end portion connected to the first ring 10 by welding and another end portion connected to the rotor coil 7 by welding, a short lead 13 having one end portion connected to the second ring 11 by welding and another end portion connected to the rotor coil 7 by welding, and a molded body 14 formed by insert molding, which retains the first ring 10, the second ring 11, the long lead 12, and the short lead 13 in a mutually insulated fashion.

The molded body 14 includes a molded-body main body 16 having a cylindrical shape, a terminal supporting portion 17 having an annular shape to be connected to the rotor coil 7, which supports terminal portions 19 of the long lead 12 and the short lead 13, and coupling portions 18 which respectively cover the long lead 12 and the short lead 13 and couple the terminal supporting portion 17 and the molded-body main body 16 to each other.

By the way, the slip ring device 5 is manufactured by using a vertical molding machine in order to increase the number of slip ring devices to be manufactured in view of productivity.

In this case, inside a die, the first ring 10 and the second ring 11 are placed so as to be oriented downward. The terminal supporting portion 17 is used as a gate for the resin.

Then, flows of the melted resin to fill the die through the gate respectively pass through a space for forming the terminal supporting portion 17 and a space for forming the two coupling portions 18 to meet in a space for forming the molded-body main body 16. Therefore, a weld line is formed on the molded-body main body 16.

In general, a tensile strength at the weld line is lowered to about 30% of a material strength. Therefore, a crack of the slip ring device 5 formed by molding is likely to be generated.

Figure 5:
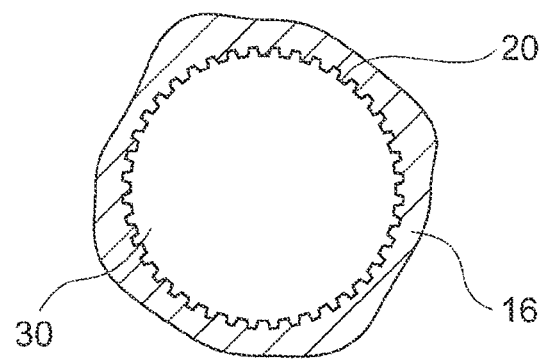
FIG. 5 is a sectional view illustrating the molded-body main body illustrated in FIG. 2.

In this embodiment, a press-fit projecting portion 20 which includes a plurality of projecting portions extending along an axial direction is formed on an inner wall surface of a hole 30 of the molded-body main body 16. The press-fit projecting portion 20 is formed over the entire circumference, as illustrated in FIG. 5.

On both end portions of the inner wall surface, non-projecting portions 21 without including the projecting portions are formed. The non-projecting portions 21 correspond to portions in which the weld line is generated.

An interference is set to have a relationship so that an inner diameter of the press-fit projecting portion 20 before press-fitting is smaller than a diameter of the shaft 2. A value of the interference is set so as to exceed the amount of expansion of the molded body 14 at a high temperature.

In this embodiment, the non-projecting portions 21 having a larger diameter size than that of the inner diameter of the press-fit projecting portion 20 are formed on the both end portions of the molded-body main body 16 in which the weld line with a low tensile strength is generated. Therefore, when the hole 30 of the molded-body main body 16 is press-fitted over the shaft 2, a stress acting on the end portions thereof is low.

As a result, the occurrence of a crack and breakage originating at the end portions of the molded-body main body 16 is lowered.

Moreover, the interference for the press-fit projecting portion 20 is set so as to exceed the amount of expansion of the molded body 14 at a high temperature. Thus, the molded body 14 can be prevented from turning relative to the shaft 2 at a high temperature.

Figure 6:
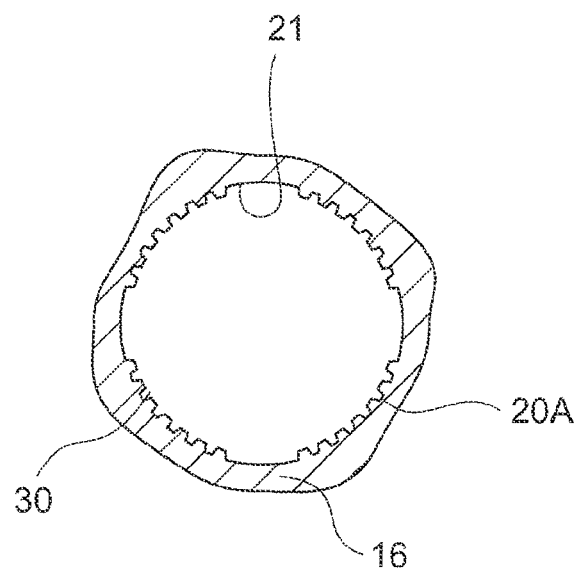
FIG. 6 is a sectional view illustrating a modification of the molded-body main body.

Depending on a portion in which the weld line is generated, the non-projecting portions 21 may be intermittently formed along a circumferential direction of the inner wall surface of the hole 30 for a press-fit projecting portion 20A, as illustrated in FIG. 6.

In this manner, the non-projecting portions 21 are formed on the portion in which the weld line with the low tensile strength is generated. As a result, when the hole 30 of the molded-body main body 16 is fitted over the shaft 2, the stress acting on the above-mentioned portion is lowered.

Thus, the interference for the press-fit projecting portion 20A can be set large as compared with that of the first embodiment. Accordingly, the molded body 14 can be more reliably prevented from turning relative to the shaft 2 at a high temperature.

The portion in which the weld line is generated is specified by resin flow analysis.

Figure 7:
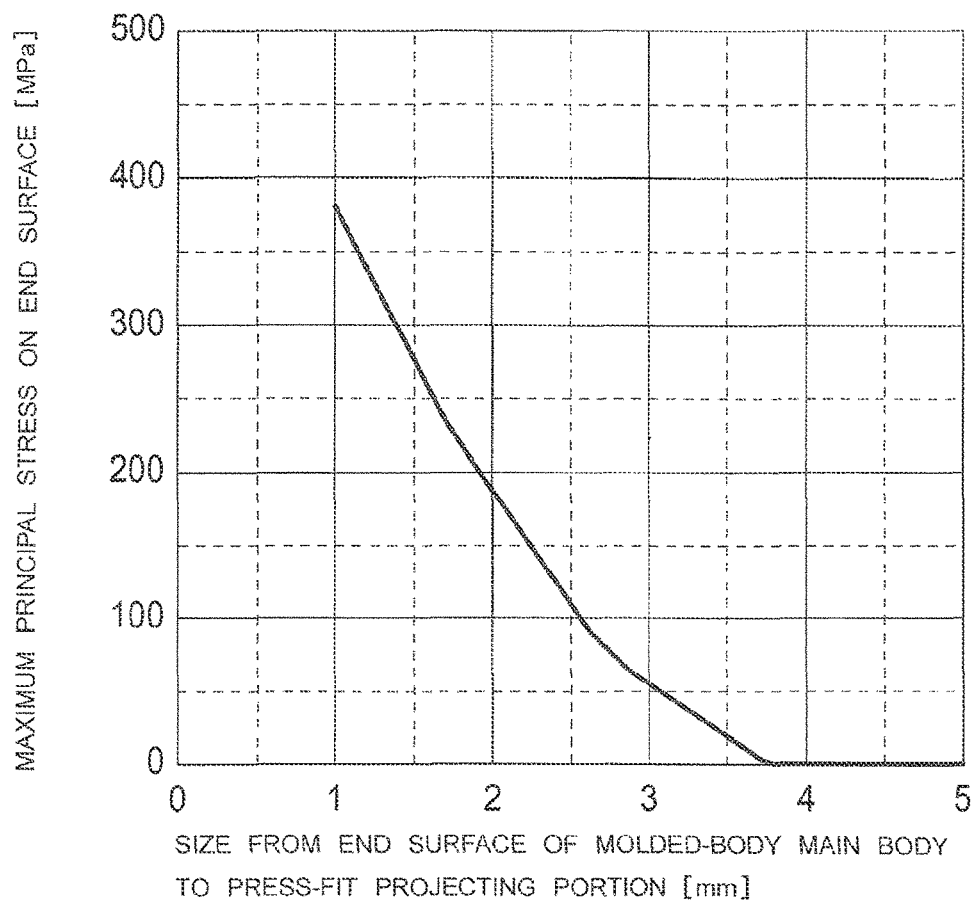
FIG. 7 is a graph showing the results of a press-fit analysis for the slip ring device.

FIG. 7 is a graph showing the results of a press-fit analysis for the slip ring device 5, which is conducted by the inventor of the present invention.

The shaft 2 used for the analysis is made of carbon steel S48C, whereas the molded body 14 is made of a polyphenylene sulfide resin (PPS resin).

As can be seen from FIG. 7, when the interference for the press-fit projecting portion 20 is 200 µm, for example, a maximum principal stress on end surfaces of the molded-body main body 16 is about 380 MPa with lengths a1 and a2 of the non-projecting portions 21 of the molded-body main body 16 being 1 mm, and is about 190 MPa with the lengths being 2 mm. Therefore, it is understood that the stress on the end surfaces of the molded-body main body 16 is halved by increasing the axial lengths of the non-projecting portions 21 by 1 mm. Moreover, when the lengths a1 and a2 of the non-projecting portions 21 are set to 3 mm, the stress becomes about 50 MPa. Therefore, it is understood that the maximum principal stress on the end surfaces of the molded-body main body 16 suddenly drops.

Moreover, it is understood that, when the lengths a1 and a2 of the non-projecting portions 21 become equal to about 3.5 mm, the maximum principal stress on the end surfaces of the molded-body main body 16 becomes approximately zero.

From the above-mentioned fact, by setting the lengths a1 and a2 of the non-projecting portions 21 from the end surfaces of the molded-body main body 16 to 3 mm or larger, the maximum principal stress acting on the end surfaces of the molded-body main body 16 can be remarkably reduced. Correspondingly, the occurrence of the crack and breakage originating at the end surfaces of the molded-body main body 16 when the hole 30 of the molded-body main body 16 is fitted over the shaft 2 can be remarkably reduced.

Second Embodiment

Figure 8:
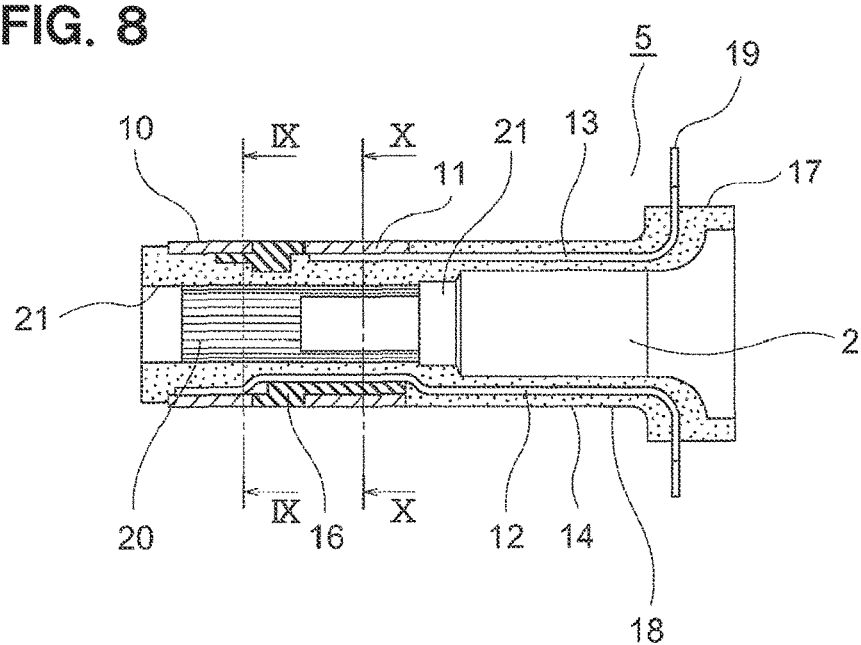
FIG. 8 is a sectional view of a principal part, illustrating the slip ring device of the rotor according to a second embodiment of the present invention.
Figure 9:
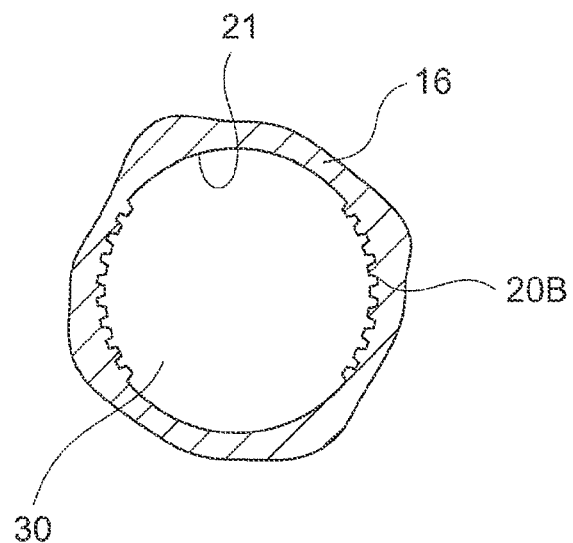
FIG. 9 is a sectional view taken along the line IX-IX of FIG. 8.
Figure 10:
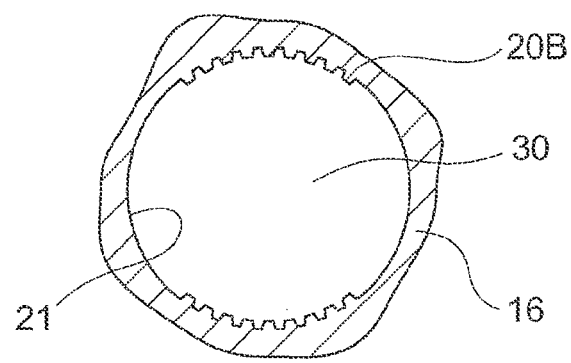
FIG. 10 is a sectional view taken along the line X-X of FIG. 8.

FIG. 8 is a sectional view of a principal part, illustrating the slip ring device 5 of the rotor 1 according to a second embodiment of the present invention, FIG. 9 is a sectional view taken along the line IX-IX of FIG. 8, and FIG. 10 is a sectional view taken along the line X-X of FIG. 8.

In this embodiment, on a press-fit projecting portion 20B, the positions of the non-projecting portions 21 on the right and on the left are different from each other by 90 degrees.

The remaining configuration is the same as that of the rotor 1 of the first embodiment.

According to the rotor 1 of this embodiment, the same effects as those obtained by the rotor 1 of the first embodiment can be obtained. In addition, in the portion in which the weld line with the low tensile strength is generated, the stress acting thereon can be reduced. Further, the effects of evenly fitting the shaft 2 and the molded-body main body 16 each other in the circumferential direction can also be obtained.

The non-projecting portions 21 may be formed intermittently along the axial direction of the inner wall surface.

Third Embodiment

Figure 11:
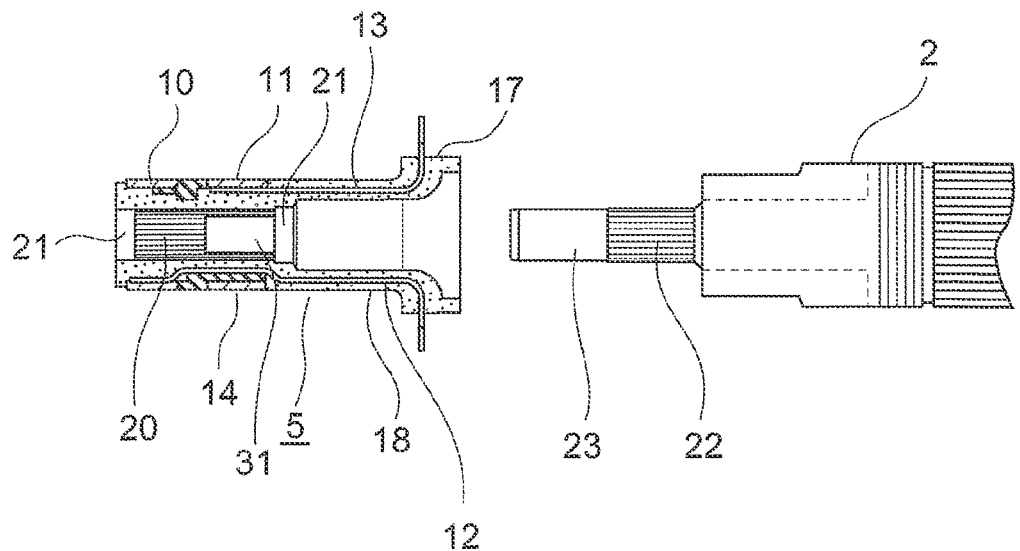
FIG. 11 is an exploded sectional view illustrating a principal part of the rotor according to a third embodiment of the present invention.
Figure 12:
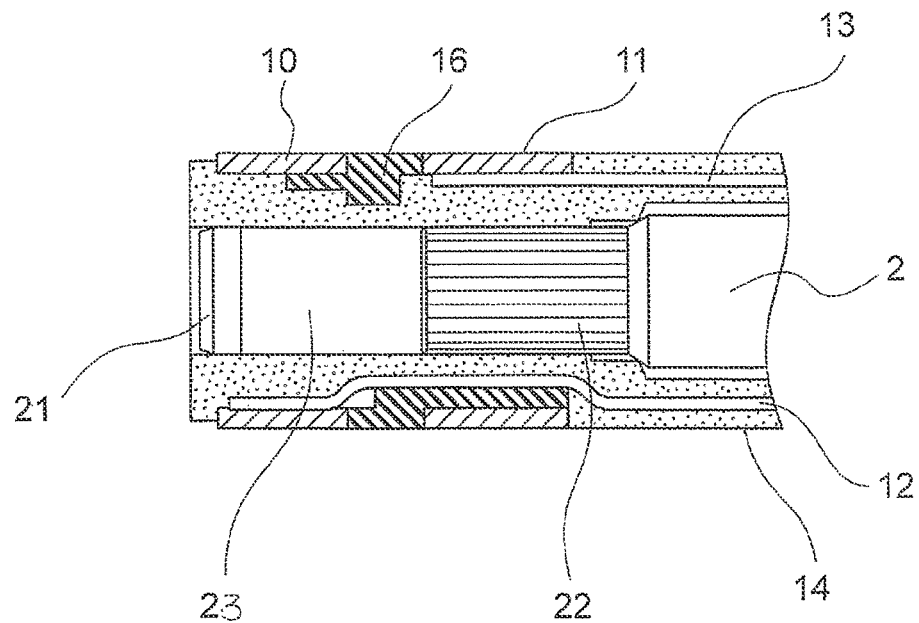
FIG. 12 is a sectional side view of a principal part of the rotor according to a third embodiment of the present invention.

FIG. 11 is an exploded sectional view illustrating a principal part of the rotor 1 according to a third embodiment of the present invention, and FIG. 12 is a sectional side view of a principal part of the rotor 1 illustrated in FIG. 11.

In this embodiment, the non-projecting portions 21 are formed on both end portions of the inner wall surface of the hole 30 of the molded-body main body 16. Between the non-projecting portions 21, the press-fit projecting portion 20 is formed on the side closer to the first ring 10. On the side closer to the second ring 11, a smooth surface 31 is formed.

On a distal end portion of the shaft 2, a smooth surface 23 and a projecting portion 22 to be press-fitted are formed. When the distal end portion of the shaft 2 is pressed into the hole 30 of the molded-body main body 16, the press-fit projecting portion 20 of the molded-body main body 16 fits over the smooth surface 23 of the shaft 2, whereas the smooth surface 31 of the molded-body main body 16 fits over the projecting portion 22 to be press-fitted.

The remaining configuration is the same as that of the first embodiment.

In this embodiment, when the distal end portion of the shaft 2 is press-fitted into the hole 30 of the molded-body maim body 16, a press-fit length between the press-fit projecting portion 20 and the shaft 2 is reduced as compared with the rotor 1 of the first embodiment. Therefore, the slip ring device 5 can be efficiently inserted over the shaft 2.

Moreover, at this time, the smooth surface 31 of the molded-body main body 16 fits over the projecting portion 22 to be press-fitted of the shaft 2. Therefore, as in the case of the rotor 1 of the first embodiment, the assembly strength of the slip ring device 5 to the shaft 2 can be obtained.

In each of the embodiments described above, the slip ring device 5 is manufactured by using the vertical molding machine. The weld lines are formed in both end portions of the molded-body main body 16. Therefore, the non-projecting portions 21 are formed on the both end portions. However, the formation of the non-projecting portions is not necessarily limited to the portions described above. When the slip ring device is manufactured by a horizontal molding machine, it is natural that a portion in which the weld line is generated is different. In accordance with the portion in which the weld line is generated, the portions on which the non-projecting portions are to be formed change.

In each of the embodiments described above, there is the interference between the inner diameter of each of the non-projecting portions 21 and the outer diameter of the shaft 2. However, a clearance fit may be employed instead.

Further, although the rotor 1 for the AC generator for a vehicle has been described in the embodiments described above, the present invention is applicable to a rotor for an AC generator other than for a vehicle, for example, for an outboard engine.

Moreover, the present invention is also applicable to a rotor for an electric motor.

REFERENCE SIGNS LIST 1 rotor, 2 shaft, 3, 4 claw-like magnetic pole, 5 slip ring device, 6 brush, 7 rotor coil, 10 first ring, 11 second ring, 12 long lead, 13 short lead, 14 molded body, 16 molded-body main body, 17 terminal supporting portion, 18 coupling portion, 19 terminal portion, 20, 20A, 20B press-fit projecting portion, 21 non-projecting portion, 22 press-fitted projecting portion, 23, 31 smooth surface, 30 hole

The invention claimed is:

1. A rotor for a rotating electric machine, comprising:
a shaft having an end portion with a smooth circumferential surface;

a slip ring device press-fitted over the shaft, the slip ring device comprising:
  a first ring and a second ring disposed coaxially so as to be separated away from each other, the first ring and the second ring being electrically connected to a rotor coil;
  a molded-body main body formed of a resin by molding, for retaining the first ring and the second ring in an insulated fashion; and
  a press-fit projecting portion comprising a plurality of projecting portions and a plurality of grooves both extending along an axial direction formed on an inner wall surface of a hole of the molded-body main body into which the shaft is press-fitted, the grooves of the plurality of grooves being provided between adjacent projecting portions of the plurality of projecting portions,
wherein an interference is set to have a relationship so that an inner diameter of the press-fit projecting portion before press-fitting is smaller than a diameter of the shaft and is set based on a difference between a thermal expansion coefficient of the molded-body main body and a thermal expansion coefficient of the shaft,
wherein the inner wall surface comprises a non-projecting portion without the plurality of projecting portions, which is formed on a portion in which a weld line is generated by the molding,
wherein the non-projecting portion extends circumferentially about the inner wall surface a circumferential distance greater than each groove of the plurality of grooves of the press-fit projecting portion,
wherein the non-projecting portion comprises a first non-projecting portion provided on a first axial end portion of the molded-body main body and a second non-projecting portion provided on a second axial end portion of the molded-body main body,
wherein the first non-projecting portion has an axial size of 3 mm or larger from a first end surface of the molded-body main body, and
wherein the second non-projecting portion has an axial size of 3 mm or larger from a second end surface of the molded-body main body.

2. A rotor for a rotating electric machine according to claim 1,
wherein the shaft is formed of carbon steel S48C, whereas the molded-body main body is formed of a polyphenylene sulfide resin (PPS resin).

3. A rotor for a rotating electric machine according to claim 1,
wherein the non-projecting portion is intermittently formed along a circumferential direction of the inner wall surface.

4. A rotor for a rotating electric machine according to claim 1,
wherein the non-projecting portion is intermittently formed along an axial direction of the inner wall surface.

5. A rotor for a rotating electric machine according to claim 1,
wherein the non-projecting portion is formed on the inner wall surface on a press-fit side of the shaft, and
wherein the shaft comprises a distal end portion having a smooth surface fitted to the press-fit projecting portion and a projecting portion to be press-fitted that is fitted to the non-projecting portion.

6. A rotor for a rotating electric machine according to claim 1,
wherein the rotating electric machine comprises an AC generator for a vehicle.

7. A rotor for a rotating electric machine according to claim 1,
wherein the interference is set to exceed an amount of expansion determined to occur between the molded-body main body and the shaft as a result of the difference between the thermal expansion coefficient of the molded-body main body and the thermal expansion coefficient of the shaft.

* * * * *